United States Patent
Wada et al.

(10) Patent No.: US 6,303,529 B1
(45) Date of Patent: Oct. 16, 2001

(54) DIELECTRIC CERAMIC, METHOD FOR PRODUCING THE SAME, LAMINATED CERAMIC ELECTRONIC ELEMENT, AND METHOD FOR PRODUCING THE SAME

(75) Inventors: Nobuyuki Wada; Takashi Hiramatsu, both of Shiga-ken; Jun Ikeda, Omihachiman; Yukio Hamaji, Otsu, all of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/234,356

(22) Filed: Jan. 20, 1999

(30) Foreign Application Priority Data

Jan. 20, 1998 (JP) .................................................. 10-008419
Aug. 24, 1998 (JP) .................................................. 10-236735

(51) Int. Cl.$^7$ .......................... C04B 35/46; C04B 35/468
(52) U.S. Cl. .............................................................. 501/137
(58) Field of Search ............................ 501/137; 428/209, 428/210

(56) References Cited

U.S. PATENT DOCUMENTS 6,078,494 * 6/2000 Hansen ............................. 361/321.5

OTHER PUBLICATIONS

Sakabe, Y. et al. Ceramics for Ultra–thin Dielectric Layer of Multilayer Ceramic Capacitors. Proceedings of the Eleventh IEEE International Symposium on Applications of Ferroelectrics, 1998. pp. 565–569.*

* cited by examiner

Primary Examiner—Blaine Copenheaver
Assistant Examiner—Jason Vincent V. de la Peña
(74) Attorney, Agent, or Firm—Ostrolenk, Faber, Gerb & Soffen, LLP

(57) ABSTRACT

A dielectric ceramic which exhibits small variation in dielectric constant, allows use of a base metal, can be fired in a reducing atmosphere and which is suitable for constituting a dielectric ceramic layer for, e.g., a laminated ceramic capacitor is obtained by firing barium titanate powder in which the c-axis/a-axis ratio in the perovskite structure is about 1.000 or more and less than about 1.003 and the amount of OH groups in the crystal lattice is about 2.0 wt. % or less. The barium titanate powder starting material preferably has a maximum particle size of about 0.3 μm or less and an average particle size of about 0.05–0.15 μm. Each particle of the barium titanate powder preferably comprises a low-crystallinity portion and a high-crystallinity portion, the diameter of the low-crystallinity portion being about 0.5 times or more the particle size of the powder. When sintered, the powder satisfies the ratio of (average grain size of the fired dielectric ceramic)/(average particle size of barium titanate powder starting material), R, of about 0.90–1.2, to thereby suppress considerable grain growth. A laminated ceramic electronic element including a laminate of a plurality of layers of the above-mentioned dielectric ceramic, as well as a method for producing the same, is described.

15 Claims, 2 Drawing Sheets

DIELECTRIC CERAMIC, METHOD FOR PRODUCING THE SAME, LAMINATED CERAMIC ELECTRONIC ELEMENT, AND METHOD FOR PRODUCING THE SAME

BACKGROUND OF THE INVENTION

1. Field of the Invention

The present invention relates to a dielectric ceramic which is advantageously used in a laminated ceramic electronic element such as a laminated ceramic capacitor having an internal conductor formed of a base metal such as nickel or nickel alloy, and to a method for producing the dielectric ceramic. The present invention also relates to a laminated ceramic electronic element which is formed of the dielectric ceramic and to a method for producing the same.

2. Description of the Related Art

Miniaturization and cost reduction of laminated ceramic electronic elements is in progress. For example, the ceramic layer has been thinned and a base metal has been employed as an internal conductor in such a ceramic electronic element. In the case of a laminated ceramic capacitor, which is one type of laminated ceramic electronic element, the dielectric ceramic layer has been formed as thin as about 3 $\mu$m and a base metal such as Cu or Ni has been employed as a material for producing an internal conductor, i.e., an internal electrode.

However, when the ceramic layer becomes thin, the strength of an electric field applied to the layer increases and causes a problem in the ceramic layer dielectric exhibits a great change in dielectric constant induced by the electric field. Decrease of the size of ceramic grains in the thickness direction of the ceramic layer also causes a problem in reliability.

In order to cope with such situations, Japanese Patent Application Laid-Open (kokai) Nos. 9-241074, 9-241075, etc. have proposed ceramic materials which enable enhanced reliability by increasing the size of ceramic grains in the thickness direction of the dielectric ceramic layer. Thus, controlling the grain size of ceramic grains allows a reduction in change of dielectric constant induced by an electric field or temperature.

However, when a barium titanate material exhibiting a strong dielectric property is used as a material for a dielectric ceramic layer having a thickness of about 1 $\mu$m or less in the above-described conventional art, the effect of electric field intensity on the dielectric ceramic layer increases to thereby lower the dielectric constant considerably. When a laminated ceramic electronic element is constructed thereof, the rated voltage must be lowered. Therefore, realization of a thin layer having a thickness as thin as 1 $\mu$m or less is difficult or impossible so long as the above-described conventional art is employed to solve the problem.

SUMMARY OF THE INVENTION

In view of the foregoing, the present invention is directed to a dielectric ceramic which is advantageously used in a laminated ceramic electronic element including a thin ceramic layer having a thickness as thin as about 1 $\mu$m or less and to a method for producing the dielectric ceramic. The present invention is also directed to a laminated ceramic electronic element which is formed of the dielectric ceramic and to a method for producing the same.

In one aspect of the present invention, there is provided a dielectric ceramic which is obtained by firing a barium titanate powder having a perovskite structure in which the c-axis/a-axis ratio in the perovskite structure is about 1.000 or more and less than about 1.003 and the amount of OH groups in the crystal lattice is about 2.0 wt. % or less.

In another aspect of the present invention, there is provided a method for producing the dielectric ceramic, which method comprises the steps of providing a barium titanate powder in which the c-axis/a-axis ratio in the perovskite structure is about 1.000 or more and less than about 1.003 and the amount of OH groups in the crystal lattice is about 2.0 wt. % or less; and firing the barium titanate powder.

The amount of OH groups is determined based on the loss at 150° C. or more as measured during thermogravimetric analysis of specimens.

The barium titanate powder preferably has a maximum particle size of about 0.3 $\mu$m or less and an average particle size of about 0.05–0.15 $\mu$m.

Also, each particle of the above-described barium titanate powder preferably comprises a low-crystallinity portion and a high-crystallinity portion, and the diameter of the low-crystallinity portion is preferably about 0.5 times or more the particle size of the powder. As shown in FIG. 1, which is a transmission electron microscopic photograph of barium titanate powder, and FIG. 2, which is an explanatory sketch therefor, the term "low-crystallinity portion" 21 used herein refers to a domain containing a number of lattice defects such as a void 22, whereas the term "high-crystallinity portion" 23 used herein refers to a domain containing no such lattice defects.

Also, when the ratio (average grain size of fired dielectric ceramic)/(average particle size of provided barium titanate powder) is represented by R, R preferably falls within the range of about 0.90–1.2.

Grains that constitute the dielectric ceramic of the present invention may have a core-shell structure in which the composition and crystal system differ between the core and the shell or a homogeneous structure having a uniform composition and crystal system.

The term "crystal system" used herein refers to a crystal system of perovskite crystals, i.e., to a cubic system having a c-axis/a-axis ratio in the perovskite structure of about 1 or to a tetragonal system having a c-axis/a-axis ratio in the perovskite structure of about 1 or more.

In yet another aspect of the present invention, there is provided a laminated ceramic electronic element including a laminate formed of a plurality of ceramic layers and an internal conductor formed along a specific interface between adjacent dielectric ceramic layers.

Specifically, in the present invention, the dielectric ceramic layer included in the laminated ceramic electronic element is constituted by a dielectric ceramic obtained by firing a barium titanate powder having a perovskite structure in which the c-axis/a-axis ratio in the perovskite structure is about 1.000 or more and less than about 1.003 and the amount of OH groups in the crystal lattice is about 2.0 wt. % or less.

In the above-described laminated ceramic electronic element, the internal conductors preferably contain a base metal such as nickel or nickel alloy.

The laminated ceramic electronic element may further include a plurality of external electrodes at different positions on a side face or faces. In this case, the internal conductors are formed such that one end of each of the internal conductors is exposed to the side face so as to be electrically connected to one of the external electrodes. Such a structure is typically applied to laminated ceramic capacitors.

In a still further aspect of the present invention, there is provided a method for producing a laminated ceramic electronic element, which method comprises the steps of providing a barium titanate powder in which the c-axis/a-axis ratio in the perovskite structure is about 1.000 or more and less than about 1.003 and the amount of OH groups in the crystal lattice is about 2.0 wt. % or less; fabricating a laminate in which a plurality of ceramic green sheets containing the barium titanate powder and internal electrodes are laminated so that the internal electrodes are present along specific interfaces of the ceramic green sheets; and firing the barium titanate powder to thereby provide a dielectric ceramic.

BRIEF DESCRIPTION OF THE DRAWINGS

Various other objects, features, and many of the attendant advantages of the present invention will be readily appreciated as the same becomes better understood with reference to the following detailed description of the preferred embodiments when considered in connection with the accompanying drawings, in which.

DESCRIPTION OF THE PREFERRED EMBODIMENTS

The barium titanate powder used in the present invention has a composition represented by formula: $(Ba_{1-x}X_x)m(Ti_{1-y}Y_y)O_3$. The composition is not further limited specifically. X may comprise Ca, single species of rare earth elements, and a combination of two or more thereof. Y may comprise single species such as Zr or Mn or a combination of two or more species thereof. In general, m is preferably about 1.000–1.035, depending on the composition of the barium titanate powder, in order to obtain a non-reducing dielectric ceramic.

The barium titanate powder which is advantageously used has a perovskite structure in which the c-axis/a-axis ratio is about 1.000 or more and less than about 1.003. Moreover, the amount of OH groups in the crystal lattice is about 2.0 wt. % or less; the maximum particle size is about 0.3 $\mu$m or less; and the average particle size is about 0.05–0.15 $\mu$m. Such a barium titanate powder can be obtained by thermally treating barium titanate powder which is produced through a wet synthesis method such as a hydrothermal synthesis method, a hydrolysis method, or a sol-gel method. There may also be employed a solid phase synthesis method in which a carbonate, an oxide, etc. of elements constituting the barium titanate powder are mixed and thermally treated.

In the above-described thermal treatment, the conditions for moderate grain growth are selected so as to realize a c-axis/a-axis ratio of about 1.000 or more and less than about 1.003. For example, the treatment is performed in air or performed in a nitrogen stream or $H_2O$ stream by controlling the temperature and time of the treatment. When a solid-phase method is used, because the c-axis/a-axis ratio might decrease depending on conditions for disintegration of the synthesized powder, the disintegration conditions must be controlled.

Figure 1:
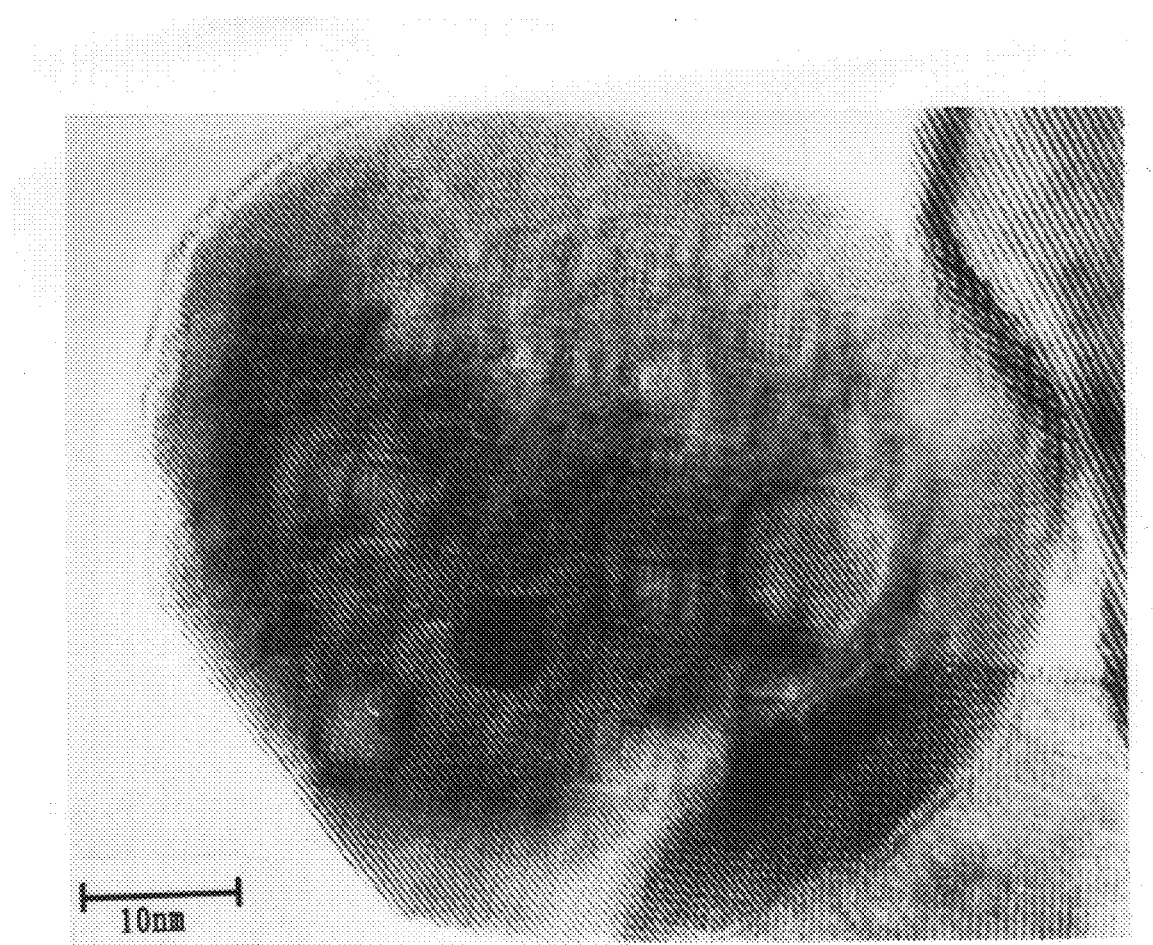
FIG. 1 is a photograph of barium titanate powder provided for producing a dielectric ceramic according to the present invention obtained by transmission electron microscopy.
Figure 2:
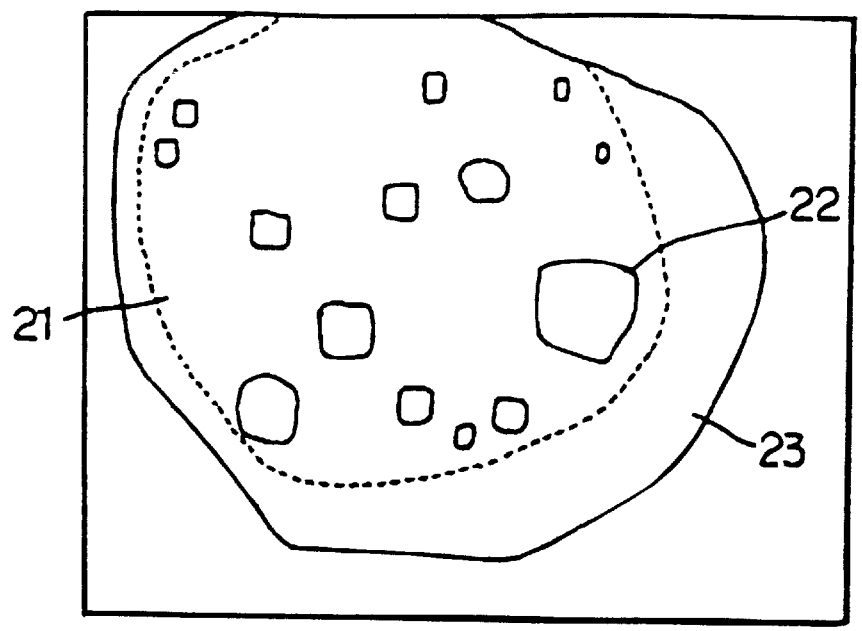
FIG. 2 is an explanatory sketch of the electron microscopic photograph shown in FIG. 2.

The diameter ratio of the low-crystallinity portion 21, i.e., the ratio of the diameter of the low-crystallinity portion 21 to the particle size of the powder, after the above-described thermal treatment, is predetermined to be about 0.5 or more in each particle of the barium titanate powder shown in FIG. 1 and FIG. 2. Such a diameter ratio may be obtained through thermal treatment at a temperature elevation rate of 5° C./min or more.

The relationship between the average particle size of the thus-provided barium titanate powder and the average grain size of the fired dielectric ceramic, i.e., the ratio of (average grain size of fired ceramic)/(average particle size of provided barium titanate powder), which is represented by R, is preferably about 0.90–1.2. Briefly, considerable grain growth is preferably prevented during sintering for producing ceramics. For example, for this purpose an Mn component and/or an Mg component, an Si-base sintering aid, etc. are added to barium titanate powder. In general, these additives may be incorporated into barium titanate powder in the form of an oxide powder or carbonate powder. Alternatively, there may be used a method in which barium titanate powder is coated with a solution containing these additives and then thermally treated.

Figure 3:
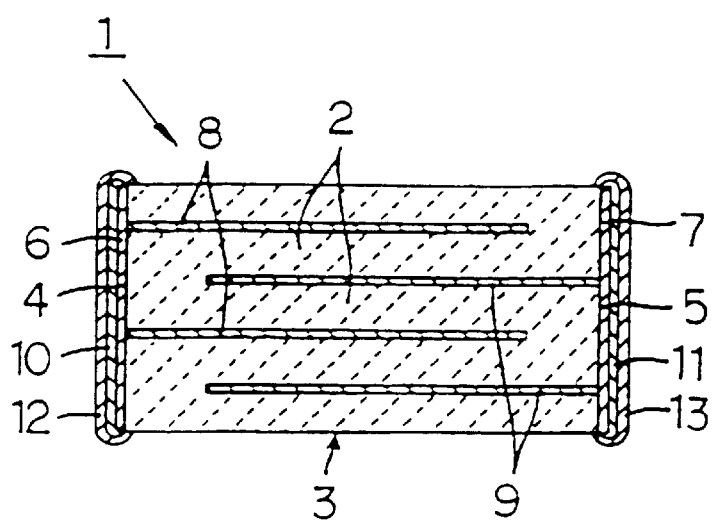
FIG. 3 is a cross-sectional view showing a laminated ceramic capacitor 1 according to one embodiment of the present invention.

Such barium titanate powder is fired to thereby produce a dielectric ceramic, which is used in a laminated ceramic electronic element, e.g., a laminated ceramic capacitor 1 illustrated in FIG. 3.

As shown in FIG. 3, the laminated ceramic capacitor 1 comprises a laminate 3 containing a plurality of laminated dielectric layers 2 and a first external electrode 6 and a second external electrode 7 which are provided on a first side face 4 and a second side face 5 of the laminate 3, respectively. The laminated ceramic capacitor 1 in its entirety constitutes a rectangular parallelepiped-shaped chip-type electronic element.

In the laminate 3, first internal electrodes 8 and second internal electrodes 9 are alternately disposed as internal conductors. The first internal electrodes 8 are formed along specific interfaces between dielectric ceramic layers 2 such that one end of each of the internal electrodes 8 is exposed to the first side face 4 of the laminate 3 so as to be electrically connected to the first external electrode 6, while second internal electrodes 9 are formed along specific interfaces between dielectric ceramic layers 2 such that one end of each of the internal electrodes 9 is exposed to the second side face 5 of the laminate 3 so as to be electrically connected to the second external electrode 7.

In the laminated ceramic capacitor 1, the dielectric ceramic layers 2 included in the laminate 3 comprise the above-mentioned dielectric ceramic.

In order to produce the laminated ceramic capacitor 1, there are provided starting materials comprising a primary component such as barium titanate and an additive to improve characteristics and sinterability. The materials are weighed in predetermined amounts and wet-mixed to form a mixed powder.

Then, an organic binder and a solvent are added into the mixed powder to thereby obtain a slurry, and a ceramic green sheet forming the dielectric ceramic layer 2 is produced by use of the slurry.

Subsequently, electrically conductive paste films forming internal electrodes 8 and 9 are formed on the specific ceramic green sheets. The conductive paste film contains a base metal such as nickel or copper, or an alloy thereof, and is formed through a method such as screen printing, vapor deposition, or plating.

A plurality of ceramic green sheets, including those on which conductive paste film has been formed as described above, are laminated, pressed, and cut if necessary. Thus, there is produced a green laminate 3 in which ceramic green sheets and the internal electrodes 8 and 9 formed along specific interfaces between ceramic green sheets are laminated, one end of each of the internal electrodes 8 and 9 being exposed to the side face 4 or 5.

The laminate 3 is then fired in a reducing atmosphere, to thereby transform barium titanate powder into the dielectric ceramic. In this step, the above-described grain size ratio R is controlled so as to fall within the range of $0.90 \leq R \leq 1.2$.

The first external electrode 6 and the second external electrode 7 are formed on the first side face 4 and on the second side face 5 of the laminate 3, respectively, so as to contact with the exposed ends of the first internal electrodes 8 and second internal electrodes 9 in the fired laminate 3.

No particular limitation is imposed on the composition of the materials for producing the external electrode 6 and 7.

Specifically, there may be used the same materials as those of the internal electrodes 8 and 9. The external electrodes may also be constructed of a sintered layer comprising electrically conductive metal powder such as powder of Ag, Pd, Ag—Pd, Cu or a Cu alloy; or a sintered layer comprising the above conductive metal powder blended with glass frit such as $B_2O_3$—$Li_2O$—$SiO_2$—$BaO$, $B_2O_3$—$SiO_2$—$BaO$, $Li_2O$—$SiO_2$—$BaO$ or $B_2O_3$—$SiO_2$—$ZnO$. The composition of the materials for producing the external electrode 6 and 7 is appropriately determined in consideration of factors relating to the laminated ceramic capacitor 1 such as use or environment of use.

As described above, the external electrodes 6 and 7 may be formed by applying the metal powder paste forming them on the fired laminate 3 and burning. The electrodes may also be formed by applying the paste on the unfired laminate 3 and burning simultaneous with firing the laminate 3.

The external electrodes 6 and 7 may be coated with plating layers 10 and 11 formed of Ni, Cu, an Ni—Cu alloy, etc., respectively, in accordance with need. The plating layers 10 and 11 may further be coated with second plating layers 12 and 13 formed of solder, tin, etc., respectively.

The present invention will next be described in detail by way of examples, which should not be construed as limiting the invention.

EXAMPLES

The laminated ceramic capacitor produced in this Example is a laminated ceramic capacitor 1 having a structure shown in FIG. 3.

Different barium titanate materials having compositions shown in Table 1 were prepared by hydrolysis. Barium titanate materials having a calcium content as high as 10 mol % were prepared by mixing barium titanate prepared by hydrolysis and calcium titanate materials prepared by hydrothermal synthesis (see H and I shown in Table 1). The resultant material powders have a particle size of 50 to 70 nm and a cubic structure containing many OH groups in lattices of a perovskite structure. Through heat-treatment of these materials under a variety of conditions in an atmosphere of air, barium titanate powders A to N having different "c/a" values (c-axis/a-axis ratio), average particle sizes, maximum particle sizes, amounts of OH groups and diameter ratios were prepared. Aggregations produced during heat-treatment were disintegrated after heat-treatment.

TABLE 1

| BaTiO$_3$ powder | $(Ba_{1-x}Ca_x)_mTiO_3$ x | m | c/a | Average particle size ($\mu$m) | Maximum particle size ($\mu$m) | Amount of OH groups (%) | Diameter ratio |
|---|---|---|---|---|---|---|---|
| A* | 0.00 | 1.005 | 1.001 | 0.08 | 0.20 | 2.24 | 0.9 |
| B  | 0.00 | 1.010 | 1.002 | 0.10 | 0.20 | 1.40 | 0.8 |
| C  | 0.00 | 1.010 | 1.002 | 0.14 | 0.27 | 1.05 | 0.5 |
| D  | 0.00 | 1.015 | 1.002 | 0.13 | 0.28 | 1.23 | 0.6 |
| E* | 0.00 | 1.015 | 1.002 | 0.14 | 0.38 | 0.82 | 0.6 |
| F* | 0.00 | 1.015 | 1.004 | 0.25 | 0.35 | 0.60 | 0.3 |
| G  | 0.05 | 1.010 | 1.000 | 0.07 | 0.20 | 1.75 | 0.9 |
| H  | 0.10 | 1.010 | 1.002 | 0.14 | 0.27 | 0.96 | 0.5 |
| I* | 0.10 | 1.010 | 1.004 | 0.25 | 0.38 | 0.65 | 0.3 |
| J* | 0.10 | 1.010 | 1.002 | 0.13 | 0.25 | 0.92 | 0.4 |

The "c/a" values shown in Table 1 were determined by X-ray diffraction of barium titanate powders. That is, the results obtained from X-ray diffraction were subjected to X-ray profile fitting using Rietveld analysis to precisely determine lattice constants. The average particle size and the maximum particle size were measured by observation of barium titanate powders under a scanning electron microscope. The amount of OH groups was measured by way of a loss of weight at a temperature of 150° C. or higher as measured by thermogravimetric analysis of barium titanate powders.

The diameter ratio shown in Table 1 is a ratio of the diameter of the low-crystallinity portion to the particle size of the powder and was determined by subjecting the powder to cut-processing so as to obtain a thin film specimen and observation under a transmission electron microscope. When the film-like specimen of powder is prepared by cut-processing, the particle size of the powder and the diameter of a low-crystallinity portion in the powder vary. In particular, since the low-crystallinity portion is not always located in the center of a powder particle, the size of the portion must be observed several times depending on the cutting site upon preparation of thin film. Thus, for observation there were selected particles having a particle size similar to the particle size observed by scanning electron microscopy. The diameter ratio was determined by observation of 10 or more such particles and calculating the average diameter ratio.

In the "BaTiO$_3$ powder" column in Table 1, "x"s of the materials $(Ba_{1-x}Ca_x)_mTiO_3$ powders A to F are 0.00. Thus, powders A to F contain no Ca, but powders G to J, in which "x"s are 0.05 or 0.10, contain Ca.

As additives for the barium titanate powders shown in Table 1, those having the compositions shown in Tables 2 and 3 were provided. Specifically, with respect to Sample Nos. 1 to 10 shown in Table 2, RE (RE represents any one of Gd, Dy, Ho, and Er), Mg and Mn were provided to be added to $BaTiO_3$ in the form of one of the above-mentioned samples A to F. A sintering aid containing Si as a primary component was also provided. With respect to Sample Nos. 11 to 19 shown in Table 3, Mg and Mn were provided as additives to the $(Ba_{1-x}Ca_x)TiO_3$ in the form of any one of the above-mentioned samples G to J. A sintering aid containing (Si, Ti)—Ba as a primary component was also provided.

described above, or may be transformed into acetylacetonates or metal soaps.

The resultant slurries were subjected to evaporation of the organic solvent to dryness and further heat-treatment, to thereby remove the organic components.

Subsequently, to each sample of the barium titanate powders to which respective additives had been added, a polyvinyl butyral binder and organic solvent such as ethanol were added, and the ingredients were subjected to wet milling so as to prepare a ceramic slurry. The resultant slurry was molded into a sheet by use of a doctor blade to thereby obtain a rectangular green sheet having a thickness of 1.0 μm. Then, on the resultant ceramic green sheet, a conductive paste containing Ni as a primary component was applied by

TABLE 2

| | | $BaTiO_3 + \alpha Mg + \gamma Mn$ | | | | | | Si-containing |
|---|---|---|---|---|---|---|---|---|
| Sample No. | Type of BaTiO₃ | α (parts by mole) | | | | β (parts by mole) | γ (parts by mole) | sintering aid (parts by mole) |
| | | Gd | Dy | Ho | Er | | | |
| 1 | A | | 0.03 | | | 0.030 | 0.005 | 3 |
| 2 | B | | 0.03 | | | 0.010 | 0.005 | 5 |
| 3 | B | | 0.03 | | | 0.020 | 0.005 | 4 |
| 4 | B | 0.03 | | | | 0.020 | 0.005 | 3 |
| 5 | B | | | 0.03 | | 0.020 | 0.005 | 4 |
| 6 | B | | 0.03 | | | 0.020 | 0.005 | 3 |
| 7 | C | | 0.02 | | | 0.020 | 0.020 | 4 |
| 8 | D | | | | 0.02 | 0.020 | 0.005 | 3 |
| 9 | E | | 0.02 | | | 0.020 | 0.005 | 3 |
| 10 | F | | 0.02 | | | 0.020 | 0.005 | 3 |

TABLE 3

| | | $(Ba_{1-x}Ca_x)TiO_3 + \beta Mg + \gamma Nb$ | | (Si,Ti)—Ba-containing |
|---|---|---|---|---|
| Sample No. | Type of BaTiO₃ | β (parts by mole) | γ (parts by mole) | sintering aid (parts by mole) |
| 11 | G | 0.01 | 0.005 | 6 |
| 12 | G | 0.02 | 0.005 | 4 |
| 13 | H | 0.02 | 0.005 | 6 |
| 14 | H | 0.02 | 0.005 | 4 |
| 15 | H | 0.02 | 0.005 | 4 |
| 16 | H | 0.02 | 0.005 | 3 |
| 17 | I | 0.02 | 0.003 | 4 |
| 18 | I | 0.02 | 0.003 | 4 |
| 19 | J | 0.02 | 0.005 | 4 |

Respective additives shown in Tables 2 and 3 were transformed into alkoxide compounds, which are soluble in organic solvent, and then were added to the barium titanate powders which had been dispersed in an organic solvent. Specifically, with respect to Sample Nos. 1 to 10, respective additives were added to the barium titanate powders such that "α," "β," "γ," and "Si-containing sintering aid," based on parts by mole, in "$BaTiO_3+\alpha RE+\beta Mg+\gamma Mn$" were as shown in Table 2. With respect to Sample Nos. 11 to 19, respective additives were added to the barium titanate powders such that "β," "γ," and "(Si,Ti)—Ba-containing sintering aid," all based on parts by mole, in "$(Ba_{1-x}Ca_x)TiO_3+\beta Mg+\gamma Mn$" were as shown in Table 3.

In order to dissolve the above-mentioned additives in an organic solvent, they may be transformed into alkoxides as way of printing to form a conductive paste film for forming internal electrodes.

Subsequently, a plurality of the thus-obtained ceramic green sheets were laminated such that leading ends of the above-mentioned conductive paste films on the sheets were arranged alternately, to thereby obtain a laminate. The resultant laminate was heated at 350° C. in an atmosphere of $N_2$ so as to burn the binder, and then fired for two hours at the temperature shown in Table 4 in a reducing atmosphere of $H_2$—$N_2$—$H_2O$ gas with a partial pressure of $10^{-9}$ to $10^{-12}$ MPa oxygen.

To the opposite side faces of the fired laminate, a silver paste containing $B_2O_3$—$Li_2O$—$SiO_2$—BaO glass frit was applied, followed by burning in a nitrogen atmosphere at 600° C. to obtain external electrodes electrically connected with the internal electrodes.

The outer size of the resultant laminated ceramic capacitor was 5.0 mm width, 5.7 mm length and 2.4 mm thickness, and the thickness of the dielectric ceramic layer existing between internal electrodes was 0.6 μm. The total number of effective dielectric ceramic layers was five, and the area of the opposing electrodes per layer was 16.3×10$^{-6}$ m$^2$.

The electrical properties of the resultant samples were measured as follows.

Electrostatic capacity (C) and dielectric loss (tanδ) were measured by use of an automatic bridge instrument according to JIS 5102, and dielectric constant (∈) was determined by use of the resultant electrostatic capacity.

In order to measure insulation resistance (R), an insulation tester was used; by application of 6 V DC for two minutes, insulation resistance (R) at 25° C. was obtained, and resistivity was calculated.

Regarding the rate of change in electrostatic capacity with respect to temperature change, the rate of change ($\Delta C/C_{20}$) within a range of −25° C. to +85° C. with reference to the electrostatic capacity at 20° C. and the rate of change ($\Delta C/C_{25}$) within a range of −55° C. to +125° C. with reference to the electrostatic capacity at 25° C. are shown.

In a high temperature loading test, time-course change of insulation resistance upon application of 6 V DC at 150° C. was measured. In this test, the average life of the samples were evaluated, wherein the life of a sample was considered to be equal to time until breakdown when the insulation resistance (R) of each sample dropped to $10^5$ Ω or less.

Breakdown voltage was measured by applying DC voltage at a voltage elevation rate of 100 V/sec.

The average grain size of dielectric ceramic contained in the resultant laminated ceramic capacitor was obtained by chemically etching polished cross-sectional surfaces of the laminate and observation of the surfaces under a scanning microscope. By use of the results and average particle sizes of the starting raw materials shown in Table 1, a ratio R, i.e., (average grain size of the dielectric ceramic)/(average particle size of the starting raw material) was measured.

The results are shown in Table 4.

TABLE 4

| Sample No. | Firing temperature (° C.) | Size ratio R | Dielectric constant | Dielectric loss tan δ (%) | Rate of capacitance change ΔC % DC3kV/mm (%) | Rate of capacitance change with respect to temperature change ΔC/C$_{20}$ (%) | ΔC/C$_{25}$ (%) | Resistivity log ρ (Ω · cm) | Breakdown voltage DC (kV/mm) | Average life (h) |
|---|---|---|---|---|---|---|---|---|---|---|
| 1* | 1050 | 1.55 | 1260 | 2.3 | −14.6 | −10.6 | −27.0 | 13.1 | 76 | 0.4 |
| 2* | 1100 | 1.76 | 1280 | 3.4 | −22.1 | −14.6 | −30.5 | 13.1 | 81 | 0.5 |
| 3 | 1100 | 1.04 | 960 | 3.6 | −3.4 | −8.8 | −12.4 | 13.2 | 88 | 65 |
| 4 | 1150 | 1.08 | 860 | 2.8 | −3.2 | −9.8 | −14.7 | 13.2 | 94 | 96 |
| 5 | 1050 | 1.05 | 910 | 2.9 | −3.3 | −9.7 | −14.8 | 13.2 | 91 | 88 |
| 6* | 1050 | 0.80 | 630 | 3.3 | −2.4 | −12.6 | −26.7 | 13.2 | 88 | 91 |
| 7 | 1150 | 1.16 | 1130 | 3.6 | −4.6 | −9.7 | −14.8 | 13.0 | 91 | 75 |
| 8 | 1100 | 1.10 | 1040 | 3.4 | −3.8 | −8.8 | −12.8 | 13.2 | 88 | 63 |
| 9* | 1150 | 1.08 | 1060 | 3.3 | −3.6 | −9.4 | −14.5 | 13.1 | 81 | 4.5 |
| 10* | 1175 | 1.04 | 1670 | 2.3 | −10.9 | −9.4 | −14.4 | 13.2 | 64 | 2.1 |
| 11* | 1100 | 1.84 | 1120 | 3.8 | −10.7 | 2.4 | 8.7 | 13.2 | 68 | 1.6 |
| 12 | 1100 | 1.05 | 740 | 2.6 | 1.3 | −1.4 | −4.6 | 13.2 | 72 | 66 |
| 13* | 1150 | 1.63 | 1210 | 5.7 | −11.4 | 3.4 | 9.7 | 13.1 | 64 | 2.5 |
| 14 | 1150 | 0.97 | 760 | 2.3 | −2.4 | −4.5 | −4.5 | 13.2 | 96 | 68 |
| 15 | 1175 | 1.05 | 870 | 2.1 | −1.5 | −4.2 | −5.8 | 13.2 | 88 | 64 |
| 16* | 1150 | 0.88 | 230 | 1.9 | 2.4 | −11.4 | −17.9 | 13.2 | 87 | 96 |
| 17* | 1250 | 1.05 | 1080 | 4.6 | −8.4 | −4.2 | −8.5 | 13.2 | 75 | 13 |
| 18* | 1200 | 0.75 | 330 | 2.5 | 1.5 | −11.3 | −16.4 | 13.2 | 83 | 67 |
| 19* | 1175 | 1.04 | 1030 | 2.8 | −8.6 | −2.2 | −2.5 | 13.2 | 85 | 72 |

The dielectric ceramic of the present invention is characterized in that it is obtained by firing barium titanate powder having a perovskite structure in which the c-axis/a-axis ratio in the perovskite structure is about 1.000 or more and less than about 1.003 and the amount of OH groups in the crystal lattice is about 2.0 wt% or less. Preferably, the barium titanate powder serving as the raw material has a maximum particle size of about 0.3 μm or less, and an average particle size of about 0.05 to about 0.15 μm. Also, each particle of the above-described barium titanate powder preferably comprises a low-crystallinity portion and a high-crystallinity portion, the diameter of the low-crystallinity portion being about 0.5 times or more the particle size of the powder, and a ratio R, i.e., (average grain size of the dielectric ceramic)/(average particle size of barium titanate powder), of about 0.90 to 1.2, so that there is no occurrence of considerable grain growth during sintering ceramic.

The sample numbers marked with * in Table 4, and the powders marked with * in Table 1 fall outside the scope of the present invention or the above-stated preferable ranges.

Regarding Sample Nos. 1 to 10 shown in Table 4 obtained through use of one of the raw material powders A to F shown in Table 1, transmission electron microscopic analysis of fired ceramic showed that near the grain boundary of a ceramic grain, the rare-earth element (RE) such as Gd, Dy, Ho, or Er diffused and formed a shell portion; and, in the center of the ceramic grain, a core portion was formed; namely, the fired ceramic assumes, within each grain, a core-shell structure in which the core and shell have different compositions and crystal systems.

As is apparent from the data of Sample No. 1 in Table 4, use of a powder having an amount of OH groups of 2.0 wt% or more, such as the material powder A shown in Table 1, is not preferable because the reactivity is too high, making the sintered ceramic grain size large; temperature characteristics of dielectric constant become excessive; and average life becomes short.

In the case of use of material powder such as the material powder E shown in Table 1 having a maximum particle size larger than 0.3 μm, as is apparent from Sample No. 9 in Table 4, the average life of the capacitor may become short, and, in the case of the present Example wherein the dielectric ceramic layer has a thickness of 1 μm or less, the reliability may become poor.

In the case of use of powder material such as the material powder F shown in Table 1 having an average particle size larger than 0.15 μm and a maximum particle size larger than 0.3 μm, as is apparent from Sample No. 10 shown in Table 4, when the dielectric ceramic layer is thin, the reliability may become poor, and electrostatic capacity change at 3 kV/mm may become excessive.

As the material powder B shown in Table 1, even in the case in which the c-axis/a-axis ratio of the material powder is 1.000 or more and less than 1.003, the amount of OH groups is 2.0 wt% or less, the maximum particle size is 0.3 μm or less, and the average particle size is within a range of 0.05 to 0.15 μm; as is apparent from Sample No. 2 shown in Table 4, when ratio R is greater than 1.2, change in the dielectric constant with temperature may become excessive and reliability may become poor.

As in the case of use of the material powder B shown in Table 1, as is apparent from Sample No. 6 shown in Table 4, when the grain size of the sintered body is made small relative to the material particle size by intensive crushing during ingredient preparation so as to achieve a ratio R of less than 0.90, the dielectric constant may be low, and temperature characteristics of electrostatic capacity may become poor.

In contrast, although in Sample Nos. 3, 4, 5, 7, and 8 shown in Table 4 the thickness of the dielectric ceramic layer is as thin as 0.6 μm, the rate of change in electrostatic capacity with temperature satisfies the B characteristic specified by JIS specifications within the range of −25° C. to +85° C., and satisfies the X7R characteristic specified by EIA specifications within the range of −55° C. to +125° C. Further, the samples can endure for 60 hours or longer until breakdown occurs in a high temperature loading test, and they can be fired at 1200° C. or lower. The change in electrostatic capacity upon application of DC voltage is as small as 5% or less and thus can ensure a high voltage rating.

Fired ceramics of Sample Nos. 11 to 19 shown in Table 4 which were obtained by use of the material powders G to J shown in Table 1 were subjected to transmission electron microscopic analysis. It was confirmed that compositional non-uniformity and non-uniform crystal system as found for individual ceramic grains in connection with Sample Nos. 1 to 17 were not observed.

The material powders G and H shown in Table 1—in which the c-axis/a-axis ratio of the material powder is 1.000 or more and less than 1.003, the amount of OH groups is 2.0 wt% or less, the maximum particle size is 0.3 μm or less, and the average particle size is within a range of 0.05 to 0.15 μm—shows that the grain size of the ceramic increases, and in the case in which the particle size ratio R is more than 1.2, reliability becomes poor and change in electrostatic capacity at 3 kV/mm may becomes large, as is apparent from Sample Nos. 11 to 13 in Table 2.

In the case of use of the material powder H shown in Table 1, as is apparent from Sample No. 16 in Table 4, when the grain size of the sintered body is made small relative to the material particle size by intensive crushing during ingredient preparation so as to achieve a ratio R of less than 0.90, the rate of change in electrostatic capacity with temperature may be large, and relative dielectric constant may become poor.

As the material powder I shown in Table 1, even in the case in which average particle size is in excess of 0.15 μm and maximum particle size is in excess of 0.3 μm, as is apparent from Sample No. 17 in Table 4, a ratio R falling within the range of 0.90–1.2 does not necessarily ensure reliability.

As in the case of use of the material powder I shown in Table 1, as is apparent from Sample No. 18 in Table 4, when the grain size of the sintered body is made small relative to the material particle size by intensive crushing during ingredient preparation so as to achieve a ratio R of less than 0.90, the change in electrostatic capacity with temperature may be large, and relative dielectric constant may become poor.

As is clear from Sample No. 19 in Table 4, when there is used the material powder J shown in Table 1 wherein each particle of barium titanate powder includes a low-crystallinity portion having a diameter 0.5 times or less the particle size of the powder—which indicates that a high-crystallinity portion occupies a large area of the powder—dielectricity might be enhanced and electrostatic capacity at 3 kV/mm might increase.

In contrast, with reference to Sample Nos. 12, 14, and 15 shown in Table 4, although the thickness of the dielectric ceramic layer is as thin as 0.6 μm, the rate of change in electrostatic capacity with temperature satisfies the B characteristic specified by JIS specifications within the range of −25° C. to +85° C., and satisfies the X7R characteristic specified by EIA specifications within the range of −55° C. to +125° C. Further, the samples can endure for 60 hours or longer until breakdown occurs in a high temperature loading test, and the samples can be fired at a temperature of not higher than 1200° C. The electrostatic capacity change upon application of DC voltage is 5% or less and can ensure a high voltage rating.

As stated above, even if grains of a dielectric have a homogeneous composition and a uniform crystal system within each particle—namely, even if the grains do not have a core-shell structure—controlling grain growth during sintering can produce a dielectric ceramic having excellent temperature-dielectric constant characteristic and high reliability, as in the cases of Sample Nos. 12, 14, and 15.

The above-described Example is directed to a laminated ceramic electronic element in the form of a laminated ceramic capacitor; however, in the case of other laminated ceramic electronic elements such as a multilayered ceramic substrate which is produced by almost the same method, the same results have been confirmed to be obtained.

As described hereinabove, ferroelectricity of the barium titanate material in the dielectric ceramic of the present invention, is suppressed by controlling the c-axis/a-axis ratio in the perovskite structure and the amount of OH groups in the crystal lattice, preferably by further controlling the maximum particle size, average particle size, structure of powder particles based on the crystallinity and the grain growth during firing of barium titanate powder serving as a starting material. Therefore, the dielectric ceramic has an excellent temperature-dielectric constant characteristic even when the ceramic is used under a strong electric field, and may serve as a dielectric material having small variation in electrostatic capacity and high reliability.

Accordingly, by use of the dielectric ceramic of the present invention, there can be obtained a high-performance laminated ceramic electronic element having an excellent temperature-dielectric constant characteristic, small variation in electrostatic capacity and high reliability. In particular, when the dielectric ceramic is applied to a laminated ceramic electronic element including a laminate in which dielectric ceramic layers and internal electrodes are superposed one on another, such as a laminated ceramic capacitor, the temperature-dielectric constant characteristic can be stabilized even in the case of a thin ceramic layer having a thickness of 1 μm or less, and thus is advantageous in miniaturizing and thinning the laminated ceramic electronic element.

When producing the dielectric ceramic by firing in a reducing atmosphere, the ceramic is not reduced during firing. Therefore, the laminated ceramic electronic element of the present invention formed by use of the dielectric ceramic allows use of a base metal such as nickel or a nickel alloy as the internal conductor material, to thereby lower costs for a laminated ceramic electronic element such as a laminated ceramic capacitor.

The dielectric ceramic according to the present invention provides excellent temperature-dielectric constant characteristics and excellent reliability, regardless of whether or not it has a core-shell structure. Therefore, when the dielectric ceramic has no core-shell structure, the temperature characteristics and reliability are not affected by the state of dispersion of an additive component, to thereby lower the variation in characteristics with firing conditions.

What is claimed is:

1. A dielectric ceramic comprising a fired barium titanate powder having a c-axis/a-axis ratio perovskite structure of about 1.000 or more and less than about 1.003 and an amount of OH groups in the crystal lattice of about 2.0 wt. % or less.

2. The dielectric ceramic according to claim 1, wherein the barium titanate powder has a maximum particle size of about 0.3 μm or less and an average particle size of about 0.05–0.15 μm.

3. The dielectric ceramic according to claim 1, wherein individual particles of the barium titanate powder comprise a low-crystallinity portion and a high-crystallinity portion, and the diameter of the low-crystallinity portion is about 0.5 times or more the particle size of the powder.

4. The dielectric ceramic according to claim 1, having a ratio R which is defined as (average grain size of the dielectric ceramic)/(average particle size of the provided barium titanate powder) within about 0.90–1.2.

5. The dielectric ceramic according to claim 1, wherein grains of the dielectric ceramic have a core-shell structure in which the composition and crystal system differ between the core and the shell.

6. The dielectric ceramic according to claim 1, wherein grains of the dielectric ceramic have a homogeneous composition and crystal system.

7. A laminated ceramic electronic element comprising a plurality of dielectric ceramic layers comprising the fired dielectric ceramic of claim 1 and an internal conductor on an interface between two adjacent dielectric ceramic layers.

8. The laminated ceramic electronic element according to claim 7, wherein the barium titanate powder has a maximum particle size of about 0.3 μm or less and an average particle size of about 0.05–0.15 μm.

9. The laminated ceramic electronic element according to claim 7, wherein individual particles of the barium titanate powder comprise a low-crystallinity portion and a high-crystallinity portion and the diameter of the low-crystallinity portion is about 0.5 times or more the particle size of the powder.

10. The laminated ceramic electronic element according to claim 7, wherein the ratio R which is defined as (average grain size of the dielectric ceramic)/(average particle size of the barium titanate powder) is within about 0.90–1.2.

11. The laminated ceramic electronic element according to claim 7, wherein grains of the dielectric ceramic have a core-shell structure in which the composition and crystal system differ between the core and the shell.

12. The laminated ceramic electronic element according to claim 7, wherein grains of the dielectric ceramic have a homogeneous composition and crystal system.

13. The laminated ceramic electronic element according to claim 7, wherein the internal conductor comprises a base metal.

14. The laminated ceramic electronic element according to claim 13, wherein the internal conductor comprises nickel or nickel alloy.

15. The laminated ceramic electronic element according to claim 7, which further includes at least two external electrodes at different positions on side faces of the laminate, wherein each of said external conductors is electrically connected to a different internal electrode.

* * * * *